June 27, 1967 W. J. SLOUGHTER 3,328,679
ELECTROMAGNETIC WELL LOGGING SYSTEMS WITH MEANS
FOR MODULATING THE DETECTED SIGNALS
Original Filed Sept. 20, 1956 3 Sheets-Sheet 1
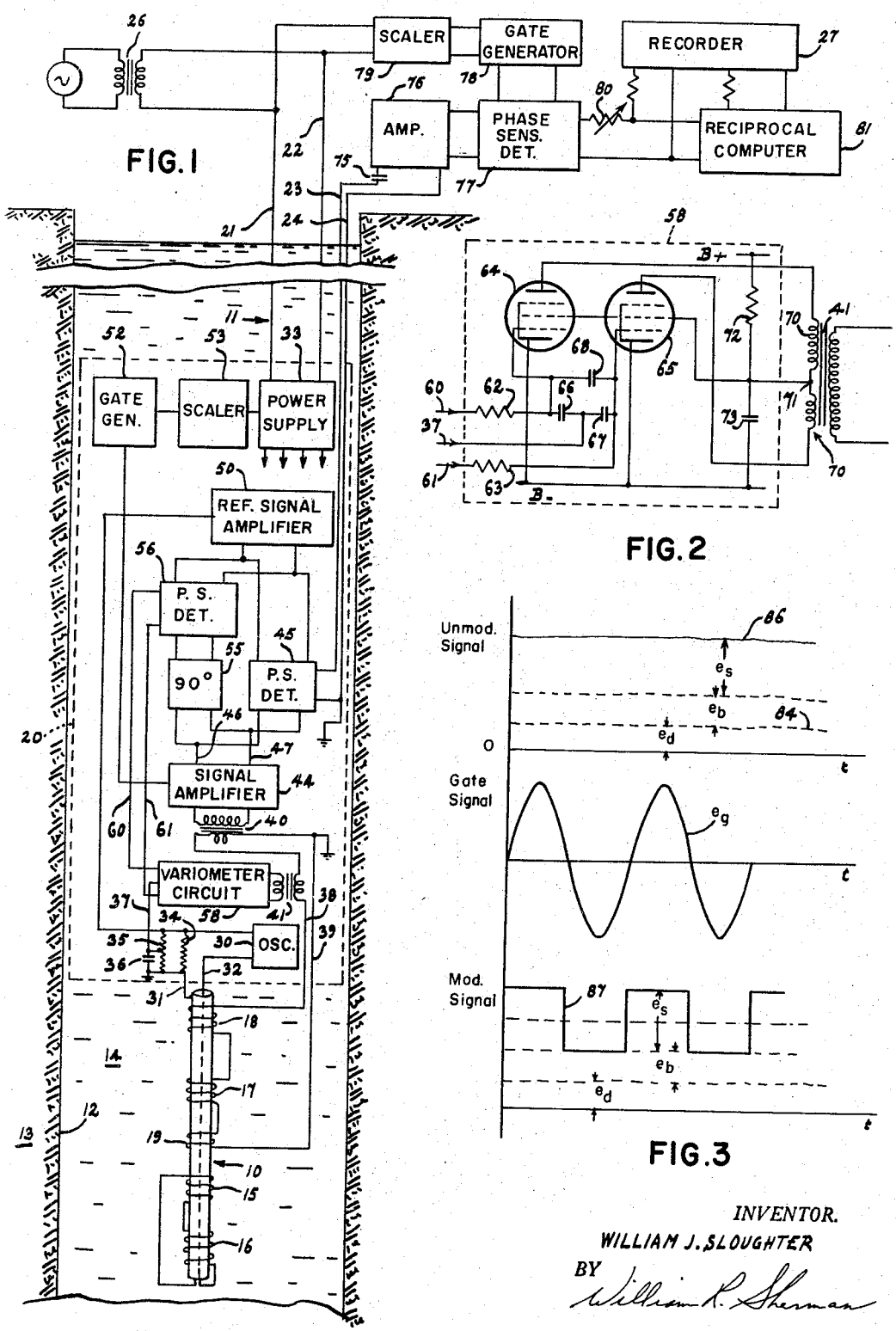
INVENTOR.
WILLIAM J. SLOUGHTER
BY
*William R. Sherman*
HIS ATTORNEY

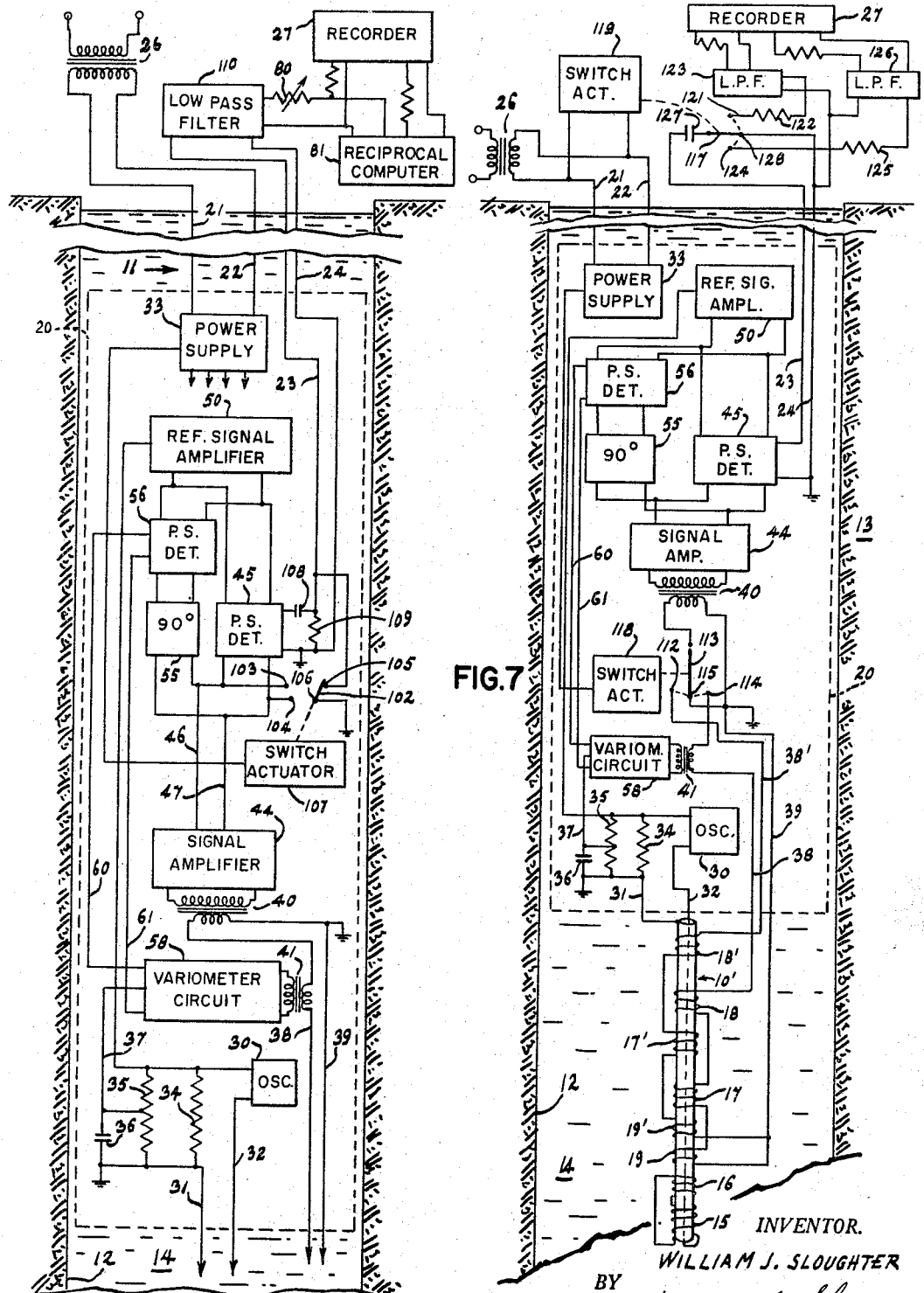

United States Patent Office 3,328,679
Patented June 27, 1967

3,328,679
ELECTROMAGNETIC WELL LOGGING SYSTEMS WITH MEANS FOR MODULATING THE DETECTED SIGNALS
William J. Sloughter, Houston, Tex., assignor, by mesne assignments, to Schlumberger Technology Corporation, Houston, Tex., a corporation of Texas
Continuation of application Ser. No. 41,718, July 6, 1960, which is a continuation of application Ser. No. 611,019, Sept. 20, 1956. This application Nov. 13, 1964, Ser. No. 412,586
15 Claims. (Cl. 324—6)

The present invention relates to apparatus for investigating earth formations traversed by a borehole and more particularly to electromagnetic well logging systems for deriving indications of the conductivity or resistivity of such formations.

This application is a continuation of applicant's copending application Ser. No. 41,718, filed July 6, 1960, now abandoned which, in turn, is a continuation of applicant's earlier application Ser. No. 611,019 for "Electromagnetic Well Logging System," filed Sept. 20, 1956, now abandoned.

Wide spread use is currently made of induction logging systems to determine the electrical conductivity of earth formations traversed by a well by passing through the well a coil system comprising alternating current energized transmitter coil means disposed in fixed relation to receiver coil means for inductive coupling therewith, and observing the magnitude of a signal component in the output of the receiver coil means that has the same phase as the energizing current. Such systems are rendered highly effective in the accurate determination of the conductivities by the employment of focussing coil techniques of the type disclosed in Patents Nos. 2,582,314 for "Electromagnetic Well Logging System" and 2,582,315 for "Differential Coil System for Induction Logging" both issued Jan. 15, 1952, to Henri-Georges Doll. In such systems, electronic equipment is commonly lowered in the borehole with the coil arrangement for amplifying and detecting the resistive component of the induced signal, so that the detected signal may readily be transmitted to the surface for accurate indications of formation conductivity or resistivity. This equipment, although very carefully designed for stability under the extremely difficult conditions of high and varying temperature and pressure at depths in a borehole, commonly requires a manual adjustment of the surface equipment to nullify any spurious unidirectional signals arising, for example, from drift or unbalance in the detector or from galvanically produced potentials attributable to current leakage in the supporting cable or the head by which it is connected to the pressure cartridge housing the electronic equipment.

It is an object of the present invention, accordingly, to provide new and improved induction well logging apparatus of the above character which does not require manual adjustment to be completely free of such spurious signals.

Another object of the invention is to provide new and improved induction well logging apparatus of the foregoing character which is insensitive to changes in such spurious signals as may occur during a logging operation whereby indications of formation conductivity of enhanced accuracy are obtainable.

A further object of this invention is to provide new and improved induction well logging apparatus of the foregoing character by which substantially simultaneous indications of formation conductivity are obtained in accordance with different investigation characteristics free from spurious unidirectional signals or drift attributable to detector unbalance.

In accordance with the present invention, transmitter coil means in an induction logging system are energized by alternating current to induce in receiver coil means an alternating signal having a resistive (or conductive) component dependent upon the conductivity of surrounding formations and a reactive component. By modulation of the induced signal, the resistive component is periodically reduced to a reference value. The resistive component is then selectively detected. If desired, the induced signal may be amplified to a higher level. The detected version of the modulated resistive component is transmitted to the surface where the modulation is removed and a corresponding unidirectional signal obtained, in response to which indications may be provided representing formation conductivity or resistivity. By modulating the induced signal prior to detection, the modulation component of the detected signal provides a measure of formation conductivity which is not altered by drift or unbalance in the detecting means.

In one form of the invention, the amplifier for the induced signal is gated on and off to modulate the detected signal. In another form, a modulator is coupled to the output of the signal amplifier to modulate the induced signal. In a further embodiment, input and output circuits of the detecting means for the resistive component are alternately shorted to provide a pulsating unidirectional signal, the average value of which represents formation conductivity. In yet another embodiment, two or more signals are induced in receiving coil means effectively having different spacings from the transmitter coil means, and such signals are modulated for sequential transmission to the surface whereby corresponding separate indications may be obtained.

For a better understanding of the invention, reference is made to the following detailed description of several representative embodiments, taken in conjunction with the accompanying drawings in which:

FIG. 1 is a schematic diagram of induction logging apparatus in accordance with the invention;

FIG. 2 is a circuit diagram of a variometer tube circuit employed in the subsurface electronic equipment of FIG. 1;

FIG. 3 is a graphical representation of signal variations in the apparatus of FIG. 1;

FIG. 6 is a schematic diagram of induction logging apparatus in accordance with a further embodiment of the invention; and FIG. 7 is a schematic diagram of induction well logging apparatus in accordance with yet another embodiment wherein multiple transmitter-receiver coil spacings are employed.

Figures 4, 5:
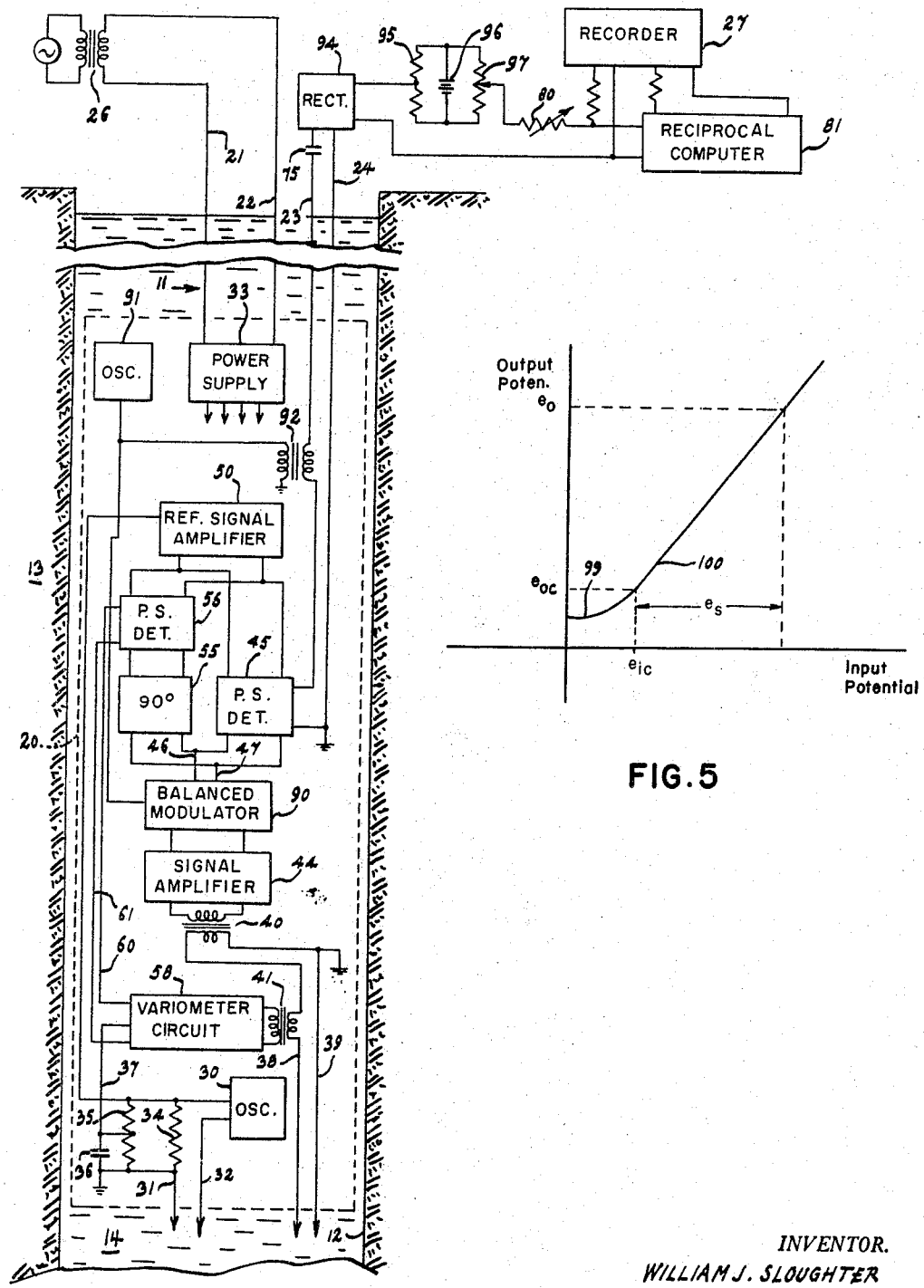
FIG. 4 is a schematic diagram of induction well logging apparatus in accordance wtih another embodiment of the invention.
FIG. 5 is a graphical representation of the characteristics of the rectifier employed in the apparatus in FIG. 4.

In FIG. 1 a typical induction logging array 10 is suspended by means of a conventional electrical cable 11 in a borehole 12 traversing each formation 13. The borehole 12 may be dry or it may contain a relatively conductive or non-conductive drilling fluid 14. The induction logging array 10 may suitably comprise a non-conductive, non-magnetic housing on which is wound a plurality of electrostatically shielded coils including, for example, a main transmitter coil 15, a transmitter focussing coil 16 therebelow, a main receiver coil 17, a receiver focussing coil 18 thereabove and also a compensating coil 19 above the transmitter coils and below the receiver coils. These coils may be arranged at fixed spacings, as described in the above-mentioned patents to Henri-Georges Doll, to form a coil assembly with a substantially zero mutual inductance. Electrically and physically connected to the coil assembly is a pressure-resistant cartridge 20 which may contain the borehole portions of the electrical equipment employed in the operation of the logging system.

The cable 11 has conductors 21, 22 and 23, 24 paired to serve as transmission links for electric power and for measure signals, respectively. At the surface, the transformer 26 serves to couple a suitable source of alternating current, such as a 60 cycle power supply, with the upper terminals of power conductors 21, 22, while the upper terminals of signal conductors 23, 24 connect with the input of electronic circuitry including a recorder 27. Recorder 27 may be of any suitable type, such as a conventional, multi-channel galvanometric recorder of the type driven in correspondence with movement of the cable to provide a record of signal variations as a function of depth.

Within the electronic cartridge 20 is an oscillator 30 having its output applied by conductors 31, 32 across the main and focussing coils 15, 16 of the transmitting array, in series opposition. The conductors 31, 32 may be arranged coaxially to extend through the coils 17, 18 and 19 of the receiving array, as well as coils 15 and 16 of the transmitting array. The oscillator 30 may be energized by a power supply 33 in the cartridge 20 connected to the lower terminals of conductors 21, 22 and may have any suitable design so as to provide an energizing signal of, say, 20 kilocycles. To provide a reference signal of this frequency and accurately in phase correspondence with the current supplied to the transmitter coil 15, there is connected in series with the output circuit of the oscillator a resistor 34 preferably having a minimum of self-inductance. A phase correcting network is connected across resistor 34 and includes a potential divider 35 and a capacitor 36 bridging a portion thereof for compensating any such self-inductance, so that the potential across capacitor 36 applied to conductor 37 with respect to ground is exactly in phase with the energizing current.

In the receiving array, main receiver coil 17 is connected in series opposing relation with focussing coil 18 and compensating coil 19 and, by means of conductors 38, 39, is connected in series with the primary and secondary windings for transformers 40 and 41, respectively. If desired, conductor 38 may be coaxial with conductor 39 and the latter conductor grounded in the cartridge 20. The secondary winding of transformer 40 is connected to the input terminals of a signal amplifier 44 which may be of conventional design, preferably including a degenerative feedback loop for enhanced phase and gain stability. The amplifier may include a plurality of stages, at least one of which includes an input circuit for modulating signals to be applied, for example, to a control grid of an amplifying device.

A first phase sensitive detector 45 has its input circuit connected to the output terminals of the signal amplifier 44 by conductors 46, 47. One of conductors 46, 47 may be grounded, although not necessarily, as in the instance shown, where the output of the signal amplifier and the input of the phase sensitive detector are both balanced with respect to ground. The detector 45 serves the purpose of selectively detecting the resistive component of the induced signal derived from the amplifier 44. This phase selectivity is obtained by supplying to the reference signal input of the phase sensitive detector, a sensitizing signal derived from a reference signal amplifier 50. This amplifier 50 has applied to its input the potential which is developed across series resistor 34 with respect to ground by the passage of the energizing current to the transmitter coil 15. Hence, the reference or sensitizing signal supplied to the phase sensitive detector 45 is accurately in phase correspondence with the transmitter coil energizing current. The output terminals of detector 45 are connected by conductors 23, 24 to the surface equipment, conductor 24 conveniently being grounded in the cartridge.

The phase sensitive detector 45 may have a variety of suitable designs, one such design being shown in volume 19 of the Radiation Laboratory Series entitled "Waveforms" by Chance et al. at pages 522–523 (published in 1949 by McGraw-Hill Book Company, New York). In general a suitable design, such as that in the referred to volume, includes asymmetrically conductive devices such as diodes or triodes connected in balanced relation. While considerable care may be taken to insure a condition of balance under varying temperatures and operational conditions, such that a zero output signal is obtained with a zero input signal of the selected phase component, nonetheless, asymmetrical conducting devices presently available are subject to change with aging, varying temperatures and operating conditions which cannot be eliminated practically in the restricted confines of a borehole cartridge.

In accordance with the present invention, the signal supplied to the amplifier 44 is suitably modulated so that it may be reproduced at the surface free from the spurious effects of drift accompanying a change in the balanced condition of the phase sensitive detector 45. In the embodiment of FIG. 1, this modulation is conveniently accomplished by applying a modulation signal to the signal amplifier 44. An appropriate modulating signal of given frequency and phase is obtained by coupling a gate generator 52 to the power supply 33 via a scaler circuit 53. The scaler is employed to obtain a modulating signal having a frequency different from the power supply frequency and serves to provide an output signal to the gate generator having one-half the frequency of the power supply, e.g., 30 cycles. The gate generator 52 may simply be an amplifier having an output circuit tuned, for example, to the third harmonic so that a 90 cycle modulating signal may be supplied to the signal amplifier 44. By a suitable amplification, the output of the gate generator 52 has a sufficient negative excursion to gate the signal amplifier off periodically at a 90 cycle rate, that is, to reduce the output of the signal amplifier substantially to zero at the periodic rate. For example, the modulating signal may be applied to a control grid of the output stage of the signal amplifier to bias the corresponding amplifying device to cut-off.

To enhance the selectivity of the phase sensitive detector 45, it is desirable to diminish the strength of the reactive component induced in the receiver array relative to the resistive component, as the reactive component may be appreciably larger despite its substantial cancellation by the employment of auxiliary coil 19 in series opposing relation to the receiver coil 17. Accordingly, a circuit may be employed of the type disclosed in copending application Ser. No. 750,307, for "Phase Rejection Networks" filed May 24, 1947, by Henri-Georges Doll, now Patent No. 2,788,483, and therein termed a "variometer" circuit. Thus, there may be connected to the output circuit 46, 47 of the signal amplifier 44 a phase shifting circuit 55 affording a 90° phase shift to bring reactive components of the amplified signal into phase with the reference signal from the reference signal amplifier 50. To detect the reactive components which are brought into phase correspondence by the shifting circuit 55, a second phase sensitive detector 56 has its output connected to the phase shifting circuit 55 and is supplied with a sensitizing signal from the reference signal amplifier 50. The phase sensitive detector 56 may be of any suitable design. However, as the reactive component is to be reduced substantially below the resistive component, a very sensitive and stable detector circuit may be desired of the type described at pages 254–255 of the "Review of Scientific Instruments," volume 22, April 1951, in an article entitled "A Phase-Sensitive Detector Circuit Having High Balance Stability" by N. A. Schuster. This circuit has a balanced input and output, the output being coupled in the present system to the gain control input terminals of variometer circuit 58.

Variometer circuit 58 may be of the type described in the above-mentioned H. G. Doll application Ser. No. 750,307 and is conveniently of the form shown in FIG. 2. The balanced output signal derived from phase sensitive detector 56 is coupled via conductors 60, 61 and series resistors 62, 63 to the respective control grids of pentode amplifying devices 64, 65 in the variometer circuit. Hence, the signal derived from the phase sensitive detector 56 and corresponding to the reactive signal component is applied as a bias signal to the respective control grids, balanced with respect to ground. Conductor 37 serves to apply the reference signal at the oscillator frequency derived from resistor 34 to both of these control grids in common. To this end, conductor 37 connects the tap point of potential divider 35 through respective coupling capacitors 66, 67 to the control grids, there being a further capacitor 68 connected between the control grids to ensure equality of the alternating potentials applied to them. Cathodes of pentodes 64, 65 are connected to the negative terminal B− of a suitable anode current supply, while the anodes are connected to the respective terminals of the balanced primary winding 70 for transformer 41. Midtap 71 of the primary winding is connected through a common anode decoupling resistor 72 to the positive terminal B+ of the anode current supply and through a by-pass capacitor 73 to the negative terminal B−.

The output winding of transformer 41 is, as stated above, connected in series with the primary winding of transformer 40, which couples to the input of the signal amplifier 44. Desirably, the amplifying devices 64, 65 are so matched that a signal of, say, 20 kilocycles may be applied to their control grids via conductor 37, in phase with the energizing current from oscillator 30, without producing a detectable output signal so long as the biasing signal supplied by detector 56 via conductors 60, 61 is zero. With a signal derived from the phase sensitive detector 56, as will usually be present, the output potential of the variometer circuit 58 developed across the secondary winding of transformer 41 is proportional to the detector output and has the same frequency as the reference signals applied via conductor 37, but is in phase quadrature therewith.

Considering now the surface electrical equipment, the measure signal which is transmitted from detector 45 via conductors 23, 24 in response to resistive signal components is coupled through means such as a blocking capacitor 75 to the input of an amplifier 76. The amplifier 76 may be of any suitable design serving to amplify the resistive signal for application to the signal input circuit of phase sensitive detector 77. The detector 77, which may be similar to detector 45, is employed as a demodulator to produce a D.C. signal corresponding to the resistive component of the signal amplifier output supplied to detector 45 in the subsurface cartridge. To achieve such demodulation, the phase sensitive detector 77 is sensitized with a reference signal corresponding to the modulation signal supplied to the signal amplifier 44. However, to avoid transmission of the modulation signal up the cable for use at the surface, a reference signal is produced at the surface which is synchronized with the modulation signal in the subsurface equipment. This synchronization is achieved by coupling a gate generator 78, similar to gate generator 52 in the subsurface cartridge, to the power supply transformer 26 via a scaler 79 similar to the subsurface scaler 53. The output of the gate generator 78 is thus in phase with, and of the same frequency and wave shape as the modulation signal developed in the subsurface equipment.

By applying the output of the gate generator 78 to the reference input of the phase sensitive detector 77, a D.C. signal is derived from the detector 77 which is coupled through variable resistor 80 to the input terminals for one channel of recorder 27. Resistor 80 serves to adjust the sensitivity of indications obtained with recorder 27 so that these indications may accurately be scaled to represent apparent formation conductivity. If desired, the output of detector 77 may also be coupled through a reciprocal computer 81 to the input terminals for another channel of recorder 27. The reciprocal computer 81 may have a variety of suitable forms, one convenient form being described in Patent No. 2,726,365 issued Dec. 6, 1955 to K. A. Bilderback for "Electro-Mechanical Computers." The channel of recorder 27 energized by reciprocal computer 81 serves to provide indications of formation resistivity which are related as the reciprocal to the indications of formation conductivity.

In a typical operation of the apparatus of FIGS. 1 and 2, the coil assembly 10 and the pressure tight cartridge 20 are moved through the borehole past formations to be investigated while the record of recorder 27 is correspondingly advanced. Oscillator 30 is energized from the power supply to pass alternating current of, say, 20 kilocycles through the transmitter coil 15 and the oppositely wound focussing coil 16, thus establishing a resultant electromagnetic field in the region surrounding coils. As a result of this field, induced currents are generated which follow circular paths, coaxial with the coil assembly and borehole, in the formations surrounding the hole. These induced currents create a secondary magnetic field which in turn induces an electromotive force in the receiver coil array in phase with the energizing current in the transmitter coil, ignoring a polarity reversal which is corrected by suitable coil connections. Since the intensity of the induced formation currents depends upon the conductivity of the formations, the transmitter current may be maintained at a constant value to render the in-phase component of the potential induced in the receiver coil array proportional to the formation conductivity. The significance of the conductivity values characterized by this in-phase component, termed either the resistive or conductive component, depends upon the effective spacing of the transmitter and receiver coils and the focussing effect of focussing coils 16 and 18. At the same time, a reactive component of electromotive force is induced in the receiver coil array which is minimized to a large extent by the reduction in mutual inductance afforded by the compensating or bucking coil 19.

Considering first the reactive component of the induced signal, this reactive component is amplified in the signal amplifier 44, shifted in phase by 90° for an in-phase relation with the reference signal derived from reference signal amplifier 50, and applied to phase sensitive detector 56. Detector 56 is sometimes termed the "X-rectifier," X being the symbol for reactance. From the detector 56, D.C. biasing signals are derived, balanced with respect to ground, which are applied to the respective control grids of pentodes 64, 65 in the variometer circuit 58. The biasing signals determine the amount of feedback introduced at the secondary winding of transformer 41 having a phase and frequency to reduce the magnitude of the reactive component derived from the receiver coil array. Depending upon the loop gain of the feedback loop for the reactive signal component, the input level of the reactive component is correspondingly reduced.

The conductive component, which is usually the larger of the two components, is amplified in signal amplifier 44 and applied directly to the phase sensitive detector 45, often termed the "R-rectifier." As the reference signal derived from amplifier 50 has the same phase and frequency as the conductive component applied to phase sensitive detector 45, this detector provides a D.C. output corresponding linearly with the conductive component. The detector 45 may, however, also develop an output signal despite the absence of an input signal, this output signal commonly being referred to as the diode drift signal $e_d$ and having its cause in a change in the balance of asymmetrically conductive devices employed in the detector. This drift signal $e_d$ is represented graphically in FIG. 3 by the dashed line 84 which has a value varying relatively slowly with time and is added to the signal $e_s$ which corresponds with the conductive signal component of the amplifier output.

In addition, spurious potentials may be introduced between the conductors 23, 24 serving to transmit the measure signal to the surface, these potentials arising from galvanic or battery action along a leakage path between the conductors. A leakage path may occur, for example, where the conductors 23, 24 are brought out of the pressure-tight cartridge 20. The presence of an electrolyte, such as conductive drilling fluid, along the leakage path is particularly effective in establishing a galvanic or battery potential. This potential, referred to as $e_b$ is added to the spurious drift signal $e_d$ arising within the phase sensitive detector 45.

In previous practice, the signal recorded at the surface might include not only the desired measure signal $e_s$, but also the detector drift signal $e_d$ and, in some instances, the battery signal $e_b$. While provision commonly was made for balancing out the spurious signals $e_d$ and $e_b$ before making an induction log, these signals are susceptible to change with elapse of time and changes in the depth of the coil assembly within the borehole.

In accordance with the present invention, these spurious signals $e_d$ and $e_b$ are eliminated from the recorded measure signal, not only at the commencement of a logging run but also continuously through the course of such run. Whereas a slowly varying, unidirectional signal (the total of $e_s$, $e_b$ and $e_d$) might be recorded heretofore, as represented by line 86 in FIG. 3, the blocking capacitor 75 in the apparatus of FIG. 1 serves to exclude the spurious D.C. signals $e_d$ and $e_b$ from the input to the recorder 27, while passing the measure signal $e_s$ which varies in accordance with the conductive component of the induced signal picked up by the receiver coil array. By applying the gate signal $e_g$ as a modulation to the signal amplifier 44, the measure signal $e_s$ is caused to vary periodically at a frequency high enough to be transmitted by the blocking capacitor 75. A preferred range of frequencies for the modulation is approximately 5 cycles per second to 300 cycles per second, but modulation frequencies above or below this range may be employed, if desired.

As described, the apparatus of FIG. 1 is arranged to provide a modulation frequency of 90 c.p.s. and of generally sinusoidal wave form, the amplitude being sufficient to drive the signal amplifier 44 sharply between cut-off and transmission of the induced signal. The output of amplifier 44 is a square wave modulated 20 kc. carrier. This output signal thus alternates between the amplified level of the induced conductive signal component and a value of zero occurring at cut-off. Upon detection of the output signal by the phase sensitive detector 45, the square wave form 87 is obtained but it is not periodically returned to a zero value where unbalance of the detector occurs. Instead, it is displaced from zero in accordance with the unbalance or drift signal $e_d$. An additional D.C. displacement of the modulated measure signal $e_s$ having the square wave form 87 occurs along the cable wherever galvanic or battery potential $e_b$ occurs. However, only the square wave form 87 representing the intelligence embodied in the measure signal $e_s$ is transmitted through the blocking capacitor 75 and is amplified in the amplifier 76 for detection by the phase sensitive detector 77. In this detector 77, the measure signal is demodulated to recover a D.C. signal having the correct value accurately to represent the formation conductivity.

By using the alternations of the power supply to synchronize reference signals supplied to both the signal amplifier 44 as modulation and to the phase sensitive detector 77 to sensitize the same, a linear demodulation is obtained. The demodulated signal is then recorded as a function of the position of the coil assembly 10 in the borehole. It may be noted that the modulation supplied to the signal amplifier 44 may be of an amplitude insufficient to drive the amplifier to cut-off. However, by employing modulation sufficient to gate the signal amplifier on and off, the signal which is recorded at the surface is freed from any dependence upon slight variations in the level of modulation occurring during a logging operation. This follows because the output of the signal amplifier 44 is driven to the reference or ground level during periods of cut-off and is of correct value to represent the induced conductive component during conductive periods.

If desired, provision may be made for manually adjusting the D.C. level of the recorder signal for purposes of calibration in the event, for example, that an unbalance exists in the coil assembly which is not removed by the employment of the demodulating circuit. To extend the range of the recorder, provision may be made for energizing separate channels in accordance with different scale factors, both with respect to the conductivity indications and the resistivity indications. The desired synchronization between the modulation signal and the reference signal supplied to the detector 77 at the surface may be secured by means other than a scaler and gate generator.

In FIG. 4 is shown an embodiment of the invention in which a phase sensitive detector at the surface is not required. Portions of the apparatus of FIG. 4 which are similar to those of FIG. 1 are identified by like reference numerals. To exemplify the variety of ways in which modulation may be introduced in the subsurface circuitry, there is shown in FIG. 4 a balanced modulator 90 coupled to the output of signal amplifier 44 and supplying a modulated version of the amplifier output to the input of the phase sensitive detector 45 and to the input of the phase shifting circuit 55 in parallel therewith. The modulator 90, which may be of any suitable design desirably having a balanced input and output, is supplied with a gate signal $e_g$ produced by an oscillator 91 in the subsurface cartridge. A portion of the signal output of the oscillator 91 is also applied across the primary winding of a transformer 92, the secondary of which is connected serially in the signal transmission link in series with cable conductor 23, for example. The modulating signal thus injected in the signal transmission link desirably has a substantially constant value, corresponding with a measure signal representing, say, 75 millimhos of formation conductivity.

In lieu of the amplifier 76, phase sensitive detector 77 and other surface equipment for demodulating the measure signal, there may be connected after the blocking condenser 75 a simple rectifier 94 of suitable form consisting, for example, of a diode connected across the line and followed by resistor across the line. For balancing out the component of the rectifier output which corresponds to the bias signal introduced at the secondary of transformer 92, there is connected to the output of the rectifier a bridge circuit 95 including a battery 96 supplying a constant voltage and a potentiometer 97 which determines the amount and polarity of the balancing potential injected. A low pass filter (not shown) may be inserted after the rectifier, if desired. In other respects, the apparatus of FIG. 4 is similar to that of FIGS. 1 and 2.

The operation of the apparatus of FIG. 4 is similar to that of the apparatus of FIGS. 1 and 2 but differs in the manner of introducing modulation and effecting demodulation of the measure signal. Thus, the bias signal introduced in the signal transmitting link via transformer 92 is transmitted by the capacitor 75 to the rectifier 94. Referring to FIG. 5, a typical rectifier characteristic is represented by curve 99 plotted as a function of A.C. input and D.C. output potentials for the rectifier 94 and having a linear portion 100 displaced from the origin.

To ensure that the rectifier 94 operates in its linear region, the magnitude of the injected bias signal represented by the value $e_{tc}$ is adjusted to place the output bias potential $e_{oc}$ of the rectifier corresponding to a zero input measure signal $e_s$ within the linear range of the rectifier. Potentiometer 97 is adjusted suitably to balance out this bias value $e_{oc}$ of the rectifier output, so that the net signal supplied to the recorder 27 represents the difference between the rectifier output $e_o$ and the bias value $e_{oc}$, which difference is proportional to the measure signal $e_s$. By introducing the bias signal in the transmission link, then, demodulation of the measure signal is obtained accurately at both low and high levels and without requiring a phase sensitive detector and reference signal source.

In another form of the invention, illustrated in FIG. 6, any drift signal appearing at the output of the phase sensitive detector 45, known as the R-rectifier, is eliminated prior to transmission of the measure signal to the surface. This is accomplished by effectively modulating both the input and the output of the detector.

As shown in FIG. 6, the modulation is accomplished by switching means which, for convenience of illustration, may be a mechanical switch 102 of the single-pole, double-throw type periodically vibrated between first contacts 103, 104 and second contacts 105, 106 by an appropriate switch actuator 107. The switch and switch actuator may, for example, be a double-pole, double-throw type of mechanical chopper. In a first position of the switch 102, contacts 103, 104 which connect respectively with conductors 46, 47, are connected together to reduce the input to the phase sensitive detector 45 to zero. In the second position of the switch 102, contact 105 which connects with the cable conductor 23 is grounded through contact 106. Since the other cable conductor 24 of the pair is grounded, the signal supplied to the surface equipment is brought to zero.

To enable recovery of the measure signal representing the conductive component of the induced potential and at the same time to eliminate any unidirectional drift signal arising from unbalance in the detector 45, there is connected across the output terminals of the detector 45 an RC circuit including series capacitor 108 and shunt resistor 109. Conveniently, capacitor 108 is connected in series with cable conductor 23, while resistor 109 is connected between the cable conductors 23, 24 and at a point beyond the capacitor 108. The values of capacitor 108 and resistor 109 are selected to obtain a suitable time constant in relation to the switching rate of switch 102. At the surface, there is connected to the upper terminals of cable conductor 23, 24, a low pass filter 110 serving to integrate or average the measure signal supplied from the subsurface cartridge. The output of this filter 110 is coupled directly to recorder 27. In other respects, the apparatus of FIG. 6 is similar to that of FIG. 1.

In a typical operation of the apparatus of FIG. 6, which is generally similar to that of FIG. 1, the switch actuator 107 vibrates switch 102 between its first and second positions at a rate such as the frequency of the alternating power supply, say, 60 cycles per second. In the first position of the switch, the input to the phase sensitive detector 45 is reduced to zero, while capacitor 108 discharges through resistor 109 to produce a measure signal for transmission to the surface. Where the capacitor 108 and resistor 109 have a relatively long time constant, the measure signal will have a substantially square wave form, the value of which is determined by the potential to which the capacitor is charged in the preceding switching cycle, when switch 102 is at its second position.

In the second position of switch 102, the full output of the signal amplifier 44 is applied to the input of the phase sensitive detector 45 to charge the capacitor 108. However, the terminals of shunt resistor 109 are shorted to ground by the switch 102. As a consequence, the capacitor may charge very rapidly to a value corresponding to the conductive component of the detector input, the time constant no longer being dependent upon the value of resistor 109. At the same time, a zero signal is supplied up the cable to the low pass filter 110. Assuming that the detector 45 drifts to an unbalanced condition and produces a D.C. output drift signal $e_d$, this drift signal is blocked by the capacitor 108 and does not contribute to its charging. Hence, on the next succeeding cycle when switch 102 is again in its first position, the value of the signal with which the capacitor 108 is charged accurately reflects the detected value of the resistive component applied to the input of the phase sensitive detector 45.

Since the measure signal supplied at the output of the detector via cable conductors 23, 24 has substantially a square wave form varying between zero potential and a potential accurately reflecting the conductive component of the signal induced in the receiver coil array, the average value of this measure signal of square wave form derived by the low pass filter 110 correctly represents formation conductivity.

If desired, the switch 102 may be operated at a frequency other than the power supply frequency so that any spurious signals of the power frequency coupled to the cable conductors 23, 24 may be filtered from the measure circuit. In lieu of a mechanical switch, an electronic switch of suitable design may be employed which serves similarly to short the input to detector 45 and the output on cable conductors 23, 24. Although for convenience of circuit design, the periods of the switch 102 in its first and second positions may be equal, such equality is not necessary to the derivation of a measure signal at the surface free from the effects of diode detector drift.

In the apparatus of FIG. 7, the advantages of freedom from response to spurious D.C. signals are obtained with a coil assembly having multiple transmitter-receiver spacings. While multiple spacings may be obtained with a variety of coil arrangements, one typical arrangement is provided in the modified coil assembly 10' of FIG. 7 wherein a transmitter coil array is the same as in FIG. 1 but an additional receiver coil array is provided having, say, a relatively long spacing. Thus, in the additional receiver coil array there are employed a receiver coil 17', a focussing coil 18', and a compensating coil 19', each of such coils being spaced above the corresponding coil of the receiver coil array having a relatively short spacing. The lower terminal of the additional receiver coil array 17'–19' may be connected to the grounded conductor 39 and its upper terminal connected directly by conductor 38' to a contact 112 of a multiple position switch 113. Since mutual inductance is less with a longer spacing, the output of the variometer circuit 58 is introduced in series with the short spacing receiver coil array but not in series with the long spacing receiver coil array. Therefore, conductor 38 connects the upper terminal of the short spacing receiver coil array through the secondary of transformer 41 to a second contact 114 of switch 113. A contact 115 for the switch may be positioned intermediate first and second contacts 112, 114 and connected to the grounded conductor 39, or switch 113 may simply be open circuited intermediate contacts 112, 114.

Switch 113 is of a type arranged to vibrate between contacts 112 and 114 through the intermediate position represented by contact 115. The contact arm of the switch 113 is connected to the ungrounded terminal of the primary winding for input transformer 40 at the input of the signal amplifier 44. To synchronize the operation of the switch 113 with a similar switch 117 at the surface, a switch actuator 118 is coupled to the power supply 31 in the subsurface cartridge to drive the switch 113, and a similar switch actuator 119 is connected across the power supply conductors 21, 22 at the surface to operate the switch 117.

The three position switch 117 at the surface has a first contact 121 connected by resistor 122 to an input terminal of low pass filter 123, the output of which is coupled to one channel of the recorder 27. The other input terminal of the filter 123 is connected to the grounded conductor 24. Similarly, a second contact 124 of switch 117 is connected via resistor 125 to an input terminal of a second low pass filter 126. The output of the second filter 126 is supplied to a second channel of recorder 27, while the other input terminal of the filter is connected to the common ground conductor 24. Resistors 122 and 125 have resistance values related to the value of a capacitor 127, which is serially connected by cable conductor 23 with the contact arm of switch 117, such that a relatively long time constant is provided in comparison with the time during which contact is made with either of switch contacts 121 or 124. An intermediate contact 128 for switch 117 is connected to cable conductor 24.

In a typical operation of the apparatus in FIG. 7, the transmitter coil 16 is energized to induce an electromotive force in both the short and long-spacing receiver coil arrays. At any instant of time, only one of the receiver coil arrays may be coupled to the input of the signal amplifier 44, the other coil array being open circuited. When the switch 113 is at its intermediate position, however, both receiver coil arrays are open circuited, and a zero signal is applied to the signal amplifier input.

Assuming that the switch 113 is in a first position engaging contact 112, the signal induced in the long-spacing receiver coil array 17'–19' is applied to the input of the signal amplifier and results in an output from the phase sensitive detector 45 which corresponds with the induced conductive component. As the detector output signal rises to this value from the substantially zero value obtaining when the switch 113 is at its intermediate position, the detected signal is coupled through capacitor 127 and through switch 117 at its corresponding first position engaging contact 121 for application to low pass filter 123. The relatively long time constant afforded by resistor 122 in series with capacitor 127 assures that the signal applied to low pass filter 123 will remain at the correct value representing the measure signal while the switches 113 and 117 are at their first position. During successive switching cycles, similar signals are applied to the filter 123 each time the switches are in their first positions, the succession of such signals having a generally rectangular wave form which is averaged by filter 123 to provide a continuous signal to the first channel of the recorder 27 varying in accordance with the formation conductivity to which the long-spacing receiver coil array is responsive.

When the switches 113 and 117 move from their first position to their intermediate position, capacitor 127 is discharged to ground. If, however, either of the spurious D.C. signals $e_d$ (detector drift) or $e_b$ (galvanic potential) are present, a charge will remain on the capacitor 127 determined by these signals. However, since these spurious signals $e_d$ and $e_b$ are steady and unidirectional, they are blocked by capacitor 127 from affecting either of the readings of the first or second recorder channels. Instead, they result in maintenance of a steady, minimum component of charge on the capacitor 127.

In the second position of the switches 113 and 117, a measure signal corresponding to the resistive component of the signal induced in the short-spacing receiver coil array 17–19 is transmitted to the surface for application to the low pass filter 126 as a signal of rectangular wave form and for application to the second channel of recorder 27 as a continuously variable signal. Since the switches 113 and 117 move to their intermediate grounded position alternately with movement from the first to the second position and with movement from the second to the first position, the capacitor 127 is always restored to its minimum charge before transmitting a signal to either of the low pass filters 123 or 126.

In order that the rising portions of the rectangular wave signals representing the respective outputs of the receiver coil arrays may properly be coupled through the capacitor 127, the switch 117 may be arranged to close the circuits to the respective low pass filters 123, 126 before the switch 113 closes the corresponding receiver coil circuit. If desired, this switch action may be accomplished by the use of electronic switches of suitable design rather than the mechanical switches 113, 117, the operation of such switches being suitably synchronized as by reference to the power supply frequency. In other respects, the operation of the apparatus in FIG. 7 may be similar to that of apparatus shown and described in connection with FIG. 1.

If desired, multiple transmitter coils may be employed as well as multiple receiver coils. The switches 113, 117 may be grounded less frequently, as once each cycle, particularly where three or more receiver coil arrays are employed. Where electronic switching is used, step-up transformers may be employed between the cartridge switch 113 and the received coil arrays for a favorable impedance level.

The invention is susceptible to various other modifications, for example, the variometer circuit 58 may be omitted, if desired, and with it the phase sensitive detector 56 and phase shifting circuit 55. In lieu of the blocking capacitor 75, a coupling transformer may be used to block transmission of spurious D.C. potentials. Suitable computer means may be employed at the surface for operating upon the conductive signal components to derive signals representing characteristics of the earth formations in addition to conductivity or resistivity, or to improve the accuracy of conductivity or resistivity indications otherwise derived.

Accordingly, the invention is not to be limited to the illustrative embodiments but is of a scope defined in the appended claims.

What is claimed is:

1. In apparatus for investigating an electrical property of earth formations traversed by a borehole, the combination comprising a transmitter and a receiver coil spaced for longitudinal movement through a borehole, means for energizing said transmitter coil to induce in said receiver coil a signal having a component dependent upon the conductivity of adjacent formations, phase sensitive detecting means responsive to said signal component for producing a measure signal representing formation conductivity, means for modulating the amplitude of said signal component periodically to vary said measure signal and thereby impart a readily identifiable characteristic thereto, and means responsive to the periodically varying measure signal for producing a signal at the surface varying with formation conductivity.

2. In apparatus for investigating an electrical property of earth formations traversed by a borehole, the combination comprising transmitter and receiving coil means spaced for longitudinal movement through a borehole, means for energizing said transmitter coil means to induce in said receiver coil means a signal having a first component dependent upon the conductivity of adjacent formations and a second component in phase quadrature with the first component, phase sensitive detecting means selectively responsive to said first signal component for producing a measure signal representing formation conductivity, means for modulating the amplitude of said first signal component periodically to vary said measure signal and thereby impart a readily identifiable characteristic thereto, and means selectively responsive to the periodically varying measure signal for providing surface indications which are a function of formation conductivity.

3. In apparatus for investigating an electrical property of earth formations traversed by a borehole, the combination comprising transmitter and receiver coil means spaced for longitudinal movement through a borehole, means for energizing said transmitter coil means to induce in said receiver coil means a signal having a first component dependent upon the conductivity of adjacent formations and a second component in phase quadrature with the first component, phase sensitive detecting means responsive to said first signal component for producing a measure signal representing formation conductivity and normally balanced to produce a zero measure signal when said first signal component is zero, means for modulating the amplitude of said first signal component periodically to vary said measure signal and thereby impart a readily identifiable characteristic thereto, and means selectively responsive to the periodically varying measure signal for providing surface indications which are a function of formation conductivity while remaining insensitive to signals arising from any unbalance of said detecting means.

4. In apparatus as defined in claim 3, the combination wherein said modulating means periodically reduces said first signal component to zero.

5. In apparatus as defined in claim 3, the combination wherein said modulating means periodically reduces said first and second signal components periodically to zero, and including feedback circuit means for diminishing said second component.

6. In apparatus as defined in claim 3, the combination including means for blocking D.C. signals arising from unbalance of said detecting means while transmitting said measure signal.

7. In apparatus for investigating an electrical property of earth formations traversed by a borehole, the combination comprising transmitter and receiver coil means spaced for longitudinal movement through a borehole, means for energizing said transmitter coil means to induce in said receiver coil means a signal having a first component dependent upon the conductivity of adjacent formations and a second component in phase quadrature with said first component, phase sensitive detecting means selectively responsive to said first signal component for producing a measure signal representing formation conductivity, means for square-wave modulating the amplitude of said first signal component periodically to reduce the same to a reference signal level, whereby said measure signal is square-wave modulated, and means selectively responsive to the square-wave modulation component of the measure signal derived from said detecting means for providing surface indications which are a function of formation conductivity.

8. In apparatus for investigating an electrical property of earth formations traversed by a borehole, the combination comprising transmitter and receiver coil means spaced for longitudinal movement through a borehole, means for passing an alternating current through said transmitter coil means to induce in said receiver coil means a signal having a first component in phase with said alternating current and a second component in phase quadrature with said alternating current, means for amplifying said induced signal, first phase sensitive detecting means responsive to the first component of the amplified induced signal for producing a corresponding measure signal, second phase sensitive detecting means responsive to the second component of the amplified induced signal for producing a feedback control signal, means responsive to said feedback control signal for diminishing the phase quadrature component of said induced signal, means for periodically reducing said amplified induced signal to zero at a given rate to impart a readily identifiable characteristic thereto, and detecting means at the surface responsive selectively to components of said measure signal alternating at said given rate for providing a signal varying with the conductivity of earth formations affecting the signal induced in said receiver coil means.

9. In apparatus for investigating an electrical property of earth formations traversed by a borehole, the combination comprising transmitter and receiver coil means spaced for longitudinal movement through a borehole, means for passing an alternating current through said transmitter coil means to induce in said receiver coil means a signal having a first component in phase with said alternating current and a second component in phase quadrature with said alternating current, means for amplifying said induced signal, balanced phase sensitive detecting means responsive to the first component of the amplified induced signal for producing a corresponding measure signal for transmission to the surface, means for periodically reducing said amplified induced signal to zero at a given rate so that the output of said detecting means during corresponding periods represents its unbalanced signal, means for blocking said unbalanced signal while transmitting said measure signal, and phase sensitive detecting means at the surface responsive to said transmitted measure signal for converting the same to a signal varying with the conductivity of earth formations traversed by said coil means.

10. In apparatus for investigating an electrical property of earth formations traversed by a borehole, the combination comprising transmitter and receiver coil means spaced for longitudinal movement through a borehole, means for passing an alternating current through said transmitter coil means to induce in said receiver coil means a signal having a first component in phase with said alternating current and a second component in phase quadrature with said alternating current, means for amplifying said induced signal, balanced phase sensitive detecting means responsive to the first component of the amplified induced signal for producing a corresponding measure signal for transmission to the surface, means for gating said amplifying means off periodically at a given rate for periodically reducing said amplified induced signal to zero, phase sensitive detecting means at the surface selectively responsive at said given rate to said measure signal for producing a corresponding detected signal and non-responsive to unidirectional input signals, and means responsive to said detected signal for providing indications varying with formation conductivity as a function of depth of said coil means in the borehole.

11. In apparatus for investigating an electrical property of earth formations traversed by a borehole, the combination comprising transmitter and receiver coil means spaced for longitudinal movement through a borehole, means for passing an alternating current through said transmitter coil means to induce in said receiver coil means a signal having a first component in phase with said alternating current and a second component in phase quadrature with said alternating current, means for amplifying said induced signal, means for modulating the amplitude of said induced signal to impart a readily identifiable characteristic thereto, balanced phase sensitive detecting means responsive to the first component of the amplified and modulated induced signal for producing a corresponding measure signal, means for mixing a constant alternating signal with said measure signal for transmission to the surface, means selectively responsive to alternating signals for rectifying said measure signal and said constant signal to provide a unidirectional signal at the surface, means for balancing out the component of said unidirectional signal corresponding to said constant signal, and means responsive to the remaining signal for providing indications varying with formation conductivity as a function of the depth of said coil means in the borehole.

12. In apparatus for investigating an electrical property of earth formations traversed by a borehole, the combination comprising transmitter and receiver coil means spaced for longitudinal movement through a borehole, means for energizing said transmitter coil means to induce in said receiver coil means a signal having a first component dependent upon the conductivity of adjacent formations and a second component in phase quadrature with said first component, phase sensitive detecting means responsive to said first signal component for producing a measure signal representing formation conductivity, means for periodically reducing the signals applied to and derived from said phase sensitive detecting means to zero, and means selectively responsive to the periodically varying component of said measure signal for providing surface indications which are a function of formation conductivity.

13. In apparatus for investigating an electrical property of earth formations traversed by a borehole, the combination comprising transmitter and receiver coil means spaced for longitudinal movement through a borehole, means for passing an alternating current through said transmitter coil means to induce in said receiver coil means a signal having a first component in phase with said alternating current and a second component in phase quadrature with said alternating current, means for amplifying said induced signal, phase sensitive detecting means responsive to the first component of said amplified induced signal for producing a corresponding measure signal, means including a capacitor for transmitting said measure signal to the surface, means for periodically and alternately reducing said amplified induced signal and said transmitted measure signal to zero whereby said capacitor blocks spurious unidirectional signals but transmits said measure signal, and means including low pass filter means at the surface responsive to said transmitted measure signal for providing indications which are a function of formation conductivity.

14. In apparatus for investigating an electrical property of earth formations traversed by a borehole, the combination comprising first and second transmitter and receiver coil means having different effective spacings for longitudinal movement through a borehole, means for energizing said transmitter coil means to induce in said receiver coil means first and second signals each having a conductive component dependent upon the conductivity of adjacent formations and a reactive component in phase quadrature with the conductive component, phase sensitive detecting means for alternately detecting the conductive components of said first and second signals to provide corresponding measure signals, means for periodically reducing the induced signals applied to said phase sensitive detecting means to zero, and means selectively responsive to said measure signals for providing corresponding surface indications which are a function of formation conductivity.

15. In apparatus for investigating an electrical property of earth formations traversed by a borehole, the combination comprising first and second transmitter and receiver coil means having different effective spacings and arranged for longitudinal movement through a borehole, means for passing alternating current through said transmitter coil means to induce in said receiver coil means first and second signals each having a conductive component in phase with said alternating current and a reactive component in phase quadrature with said alternating current, signal amplifying means, means for alternately applying said first and second signals to the input of said signal amplifying means and for periodically reducing the applied signals to zero, phase sensitive detecting means responsive to the output of said amplifying means for transmitting a rectangular wave train to the surface, alternate portions of which correspond to the conductive component of said first and second signals, means for blocking steady unidirectional signals transmitted to the surface, recorder means, and means for applying alternate portions of said transmitted rectangular wave train to said recorder means for producing separate indications which are a function of the formation conductivities detected by said first and second coil means.

References Cited

UNITED STATES PATENTS

| | | | |
|---|---|---|---|
| 2,220,070 | 11/1940 | Aiken | 324—6 |
| 2,220,788 | 11/1940 | Lohman | 324—6 |
| 2,415,364 | 2/1947 | Mounce | 324—1 |
| 2,451,596 | 10/1948 | Wheeler | 324—3 |
| 2,573,133 | 10/1951 | Greer | 324—1 |
| 2,582,314 | 1/1952 | Doll | 324—6 |
| 2,712,609 | 7/1955 | Herzog et al. | |
| 2,723,375 | 11/1955 | Schuster | 324—6 |
| 2,782,364 | 2/1957 | Shuler et al. | 324—10 X |
| 2,790,138 | 4/1957 | Poupon | 324—6 |
| 2,880,389 | 3/1959 | Ferre et al. | 324—1 |
| 2,884,589 | 4/1959 | Campbell | 324—1 |
| 2,928,038 | 3/1960 | Huddleston | 324—6 |
| 3,052,835 | 9/1962 | Dunlap et al. | 324—1 |

WALTER L. CARLSON, *Primary Examiner.*

G. R. STRECKER, *Assistant Examiner.*